C. E. WAKEMAN.

Assignor of one-half interest to P. A. HITCHCOCK.

Knit Fabric for Stockings, &c.

No. 8,353. Reissued July 30, 1878.

WITNESSES

F. L. Durand

Frank Gall

By

INVENTOR

Charles E. Wakeman

Alexander Mason

Attorneys

N. PETERS, PHOTO-LITHOGRAPHER, WASHINGTON, D. C.

BEST AVAILABLE COPY

UNITED STATES PATENT OFFICE.

CHARLES E. WAKEMAN, OF PONTIAC, MICHIGAN, ASSIGNOR OF ONE-HALF INTEREST TO P. A. HITCHCOCK.

IMPROVEMENT IN KNIT FABRICS FOR STOCKINGS, &c.

Specification forming part of Letters Patent No. 174,339, dated February 29, 1876; Reissue No. 8,353, dated July 30, 1878; application filed March 27, 1878.

*To all whom it may concern:*

Be it known that I, CHAS. E. WAKEMAN, of Pontiac, in the county of Oakland and State of Michigan, have invented certain new and useful Improvements in Knit Fabrics for Stockings, &c.; and do hereby declare that the following is a full, clear, and exact description thereof, reference being had to the accompanying drawings, and to the letters of reference marked thereon, which form a part of this specification.

My invention consists in a fulled knit woolen fabric provided with a lining of woolen loops, as will be hereinafter more fully set forth.

In order to enable others skilled in the art to which my invention appertains to make and use the same, I will now proceed to describe its construction and operation, referring to the annexed drawings, in which—

Figure 1:
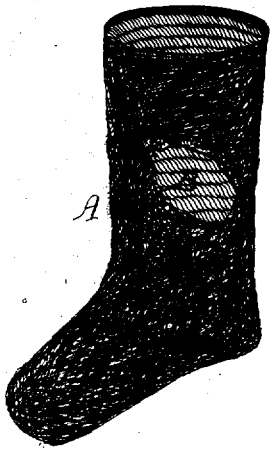
Figure 2:
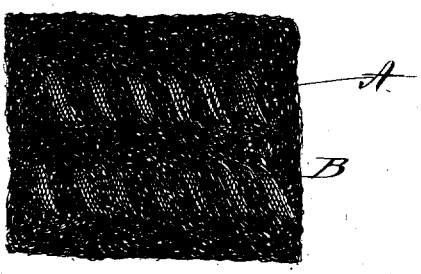

Figure 1 is a side view of a stocking embodying my invention. Fig. 2 shows a piece of the goods.

To illustrate an article made from my fabric, A represents a woolen sock made on an ordinary knitting-machine in the usual manner. This stocking is then placed in an ordinary fulling-machine, and there manipulated in the manner usual to such machines, whereby the same is fulled and thickened and a nap put on the outside and inside thereof. After the fabric has been fulled it is lined throughout by means of a series of circumferential rows of woolen loops, B, sewed in by hand or otherwise, as shown, forming a soft, yielding, and pliable lining.

The fabric thus made may be used in any form desired, and when made in the form of socks it may be used without shoes by attaching a sole of buckskin or other suitable material to the under side of the foot.

Having thus fully described my invention, what I claim as new, and desire to secure by Letters Patent, is—

As a new article of manufacture, a fulled knit woolen fabric provided with a lining of woolen loops, substantially as herein set forth.

In testimony that I claim the foregoing I have hereunto set my hand and seal this 16th day of March, 1878.

C. E. WAKEMAN. [L. S.]

Witnesses:
CALVIN S. HAMLIN,
ADOLPHUS W. BURTT.